Sept. 25, 1934.  J. F. LUBEY  1,974,619
COLLAPSIBLE SEAT
Filed July 8, 1933   2 Sheets-Sheet 1
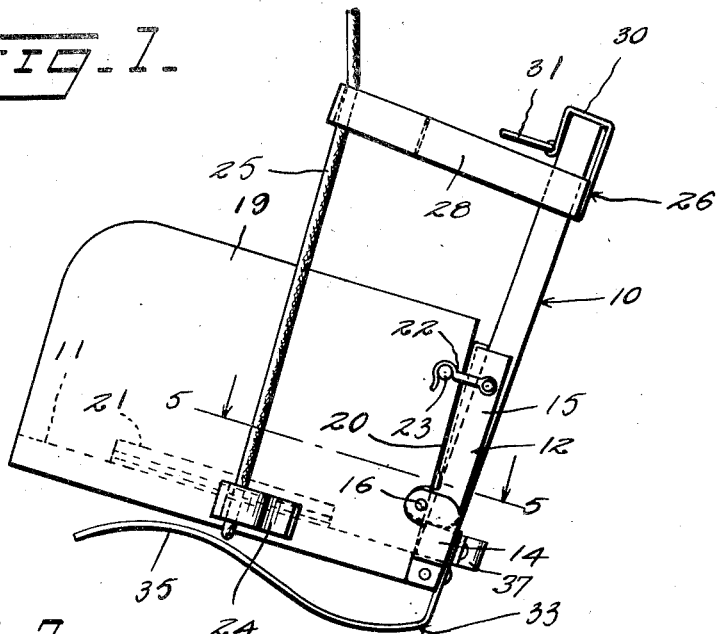
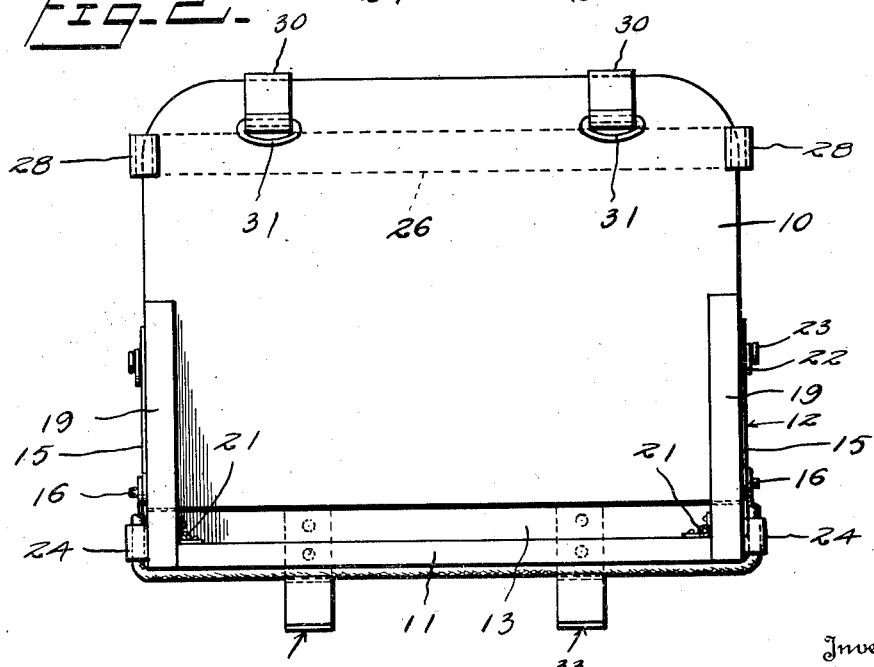
Inventor
J. F. Lubey
By Watson E. Coleman
Attorney Sept. 25, 1934.　　　　J. F. LUBEY　　　　1,974,619
COLLAPSIBLE SEAT
Filed July 8, 1933　　　2 Sheets-Sheet 2
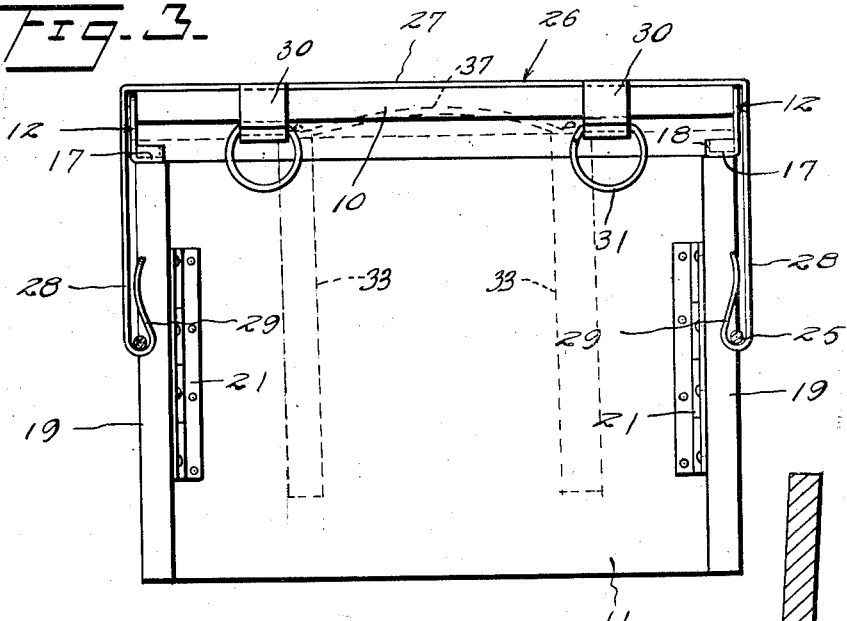
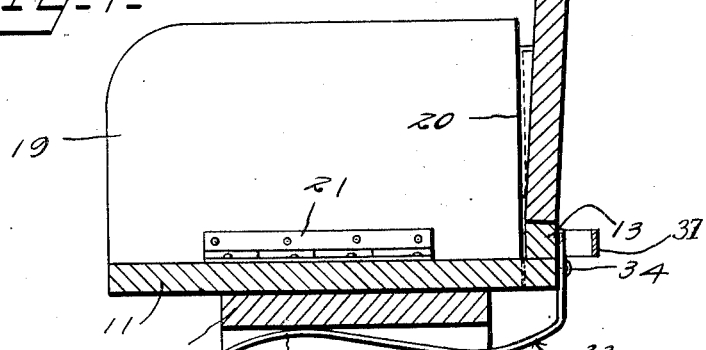
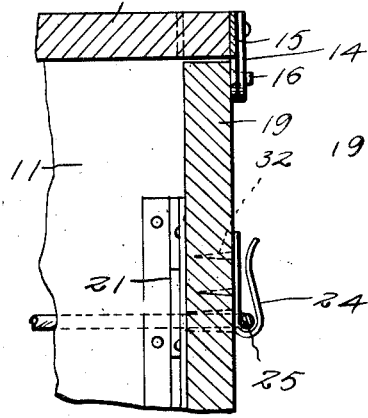
Inventor
J. F. Lubey
By Watson E. Coleman
Attorney Patented Sept. 25, 1934

1,974,619

UNITED STATES PATENT OFFICE 1,974,619

COLLAPSIBLE SEAT

John F. Lubey, Herkimer, N. Y.

Application July 8, 1933, Serial No. 679,550

2 Claims. (Cl. 155—58)

This invention relates to collapsible seats, and more particularly to a collapsible seat structure which is particularly designed for use at picnics or the like.

An object of this invention is to provide a collapsible seat structure which embodies features whereby the device can be used as the seat of a swing for holding a small child, or the device can be used as a seat which can be readily secured to a horizontal support.

Another object of this invention is to provide a seat structure of this kind which, when used as a swing, will be disposed in such a position that a child in the seat will not readily fall out and the child will be comfortably positioned in the seat.

A further object of this invention is to provide a seat of this kind which is so constructed that it can be readily folded up so that it will occupy a relatively small amount of space and can, therefore, be readily positioned in a tool box or trunk or other carrier.

The above and various other objects and advantages of this invention will in part be described and in part be understood from the following detailed description of the present preferred embodiment, the same being illustrated in the accompanying drawings, wherein:—

Figure 1 is a detail side elevation of a seat constructed according to the preferred embodiment of this invention.

Figure 2 is a detail front elevation of the seat.

Figure 3 is a top plan view of the seat.

Figure 4 is a longitudinal section partly in detail of the seat with the swing attachments removed from the seat.

Figure 5 is an enlarged fragmentary sectional view taken on the line 5—5 of Figure 1.

Figure 6 is an end elevation partly broken away of the seat in collapsed position.

Referring to the drawings wherein like numerals of reference designate corresponding parts throughout the several views, the numeral 10 designates generally the back of a seat structure which is provided with a bottom 11. The bottom 11 is provided at the back thereof with a transversely extending rib or flange 13, the purpose for which will be hereinafter described.

A hinge structure, generally designated as 12, and which comprises a lower leaf 14 and an upper leaf 15 hingedly connects the back 10 to the bottom 11. A pivot 16 pivotally connects the lower and upper leaf members 14 and 15, respectively, together. This upper leaf 15 is made relatively long and has an inwardly extending plate 17 provided with a rib 18 so that the plate 17 will be offset forwardly from the front side of the back 10. This rib 18 is of tapering construction and in this manner, the side members or arms 19 can be provided with a straight or square rear edge 20 and the back 10 will be inclined rearwardly and upwardly when in operative position. The side arms 19 are secured to the bottom 11 one on each side of the bottom by means of a hinge 21.

Preferably, the hinge 21 engages the side arm 19 at a point upwardly from the lower edge of the side arm so that the lower projecting portion of the side arm 19 will contact with the adjacent edge of the bottom 11 and this edge of the bottom 11 will act as a stop to prevent outward swinging of the arm 19. A hook 22 is pivotally secured to the upper leaf member 15 and a pin 23 is secured to a side arm 19 adjacent the upper edge thereof and this hook 22 holds the seat in assembled position. There are two of these side arms 19 and two hooks 22 together with two pins 23.

In order to use the seat herein disclosed as the seat of a swing, I have provided a pair of yieldable clips 24 which are secured one to each side arm 19 adjacent the lower edge thereof, and these clips are adapted to receive in the bight thereof a flexible member in the form of a rope 25 or the like. These clips 24 are disposed at a point adjacent the longitudinal center of the side arms 19 and in this position, the back 10 is overbalanced rearwardly so that when the seat is secured to the rope 25, the back 19 and the bottom 11 will be inclined as shown in Figure 1.

In order to prevent tipping of the seat when in this position, I have provided a stabilizing means in the form of an elongated bar 26 which is substantially U-shaped in form with the bight 27 thereof engaging against the rear side of the back 10 and the parallel arms 28 thereof extending forwardly and provided at the terminal ends thereof with yieldable clips 29. The stabilizing member 26 is removably secured to the back 10 by means of a pair of clips 30 which are secured to the bight 27 in spaced relation to each other and engage over the upper edge of the back 10.

A pair of eyes or rings 31 are secured to the free ends of the clips 30 and these eyes or rings 31 provide means for securing a strap or the like to the back 10 so as to prevent a small child from falling out of the seat. The side clips 24 are preferably permanently attached to the side arms 19 by means of securing members 32 or the like, whereas the stabilizing member 26 is preferably detachably positioned on the upper edge of the back 10 so that when the device is in collapsed position, the stabilizing member 26 can be readily removed, thereby permitting the folding or collapsing of the seat into a smaller area.

A yieldable clamp 33 is secured as by securing members 34 in a position with the free end 35 thereof directed forwardly and disposed beneath the bottom 11. This bottom clamp 33 is adapted to engage beneath a horizontal support 36 and to hold the seat in a horizontal position on top of this horizontal support. In order to facilitate carrying the seat hereinbefore described when it is in collapsed position, a conventional looped handle 37 is provided on the rear of the device.

It will, therefore, be obvious that the seat hereinbefore described can be used either as a swing or as a stationary and removable seat which can be detachably mounted on a horizontal support such as the side of a table or bench. It is, of course, understood that in the disclosure shown in Figure 4, the stabilizing member 26 can be mounted on the upper edge of the back 10 so that a means will be provided for attaching the straps engaging about the waist or body of a small child, thereby preventing the child from falling forwardly when in the seat.

In the use of this seat structure, where it is desired to use it as a swing, the rope or flexible member 25 can be disposed about the sides and bottom with the rope positioned in the clips 24 and in the stabilizing clips 29. In this position, the natural position of the swing is as shown in Figure 1, that is, overbalanced slightly to the rear so that a small child, when positioned in the seat, will not be leaning forwardly and in a relatively uncomfortable position. The seat is carried as luggage in the position shown in Figure 6, that is, in a collapsed position, and in order to dispose the seat in operative position, the back 10 is raised on the hinge structure 12 and the sides 19 raised so that the outer side of the side arms 19 will be in substantial alinement with the adjacent edge of the back 10. The hooks or securing members 22 can then be engaged with the pins 23 and the seat will then be in operative position.

Where it is desired to use the seat as a small chair or the like, the bottom 11 can be positioned on the upper surface of a horizontal support such as 36 and the clamp 33 will yieldably hold the seat in upright or horizontal position.

It is, of course, understood that various changes and modifications may be made in the details of construction and design of the above specifically described embodiment of this invention without departing from the spirit thereof, such changes and modifications being restricted only by the scope of the following claims.

What is claimed is:—

1. A collapsible seat as set forth comprising a back, a bottom, hinged means engaging the opposite edges of the back and the bottom to swingably mount the back on the bottom, side arms pivotally carried by the opposite edges of the bottom, coacting means carried by the side arms and the back to hold the arms and back in operative position, a pair of yieldable clips secured one to each side arm adjacent the bottom thereof for engagement with a flexible member to hold the flexible member in substantially the longitudinal center of the bottom, a U-shaped stabilizing member, clips carried by said stabilizing member at the bight thereof and engaging the back to removably mount the stabilizing member on the back, and reverted yieldable members integral with the free legs of the stabilizing member and adapted to engage the flexible member to hold the seat against rearward tipping.

2. In combination, a collapsible seat comprising a back, a bottom, hinged means engaging the opposite edges of the back and the bottom to swingably mount the back on the bottom, side arms, means for swingably securing the side arms on the bottom, coacting means carried by the side arms and the back to hold the arms and back in operative position, means carried by said hinged means and engaging the rear edge of each side arm to dispose the back in rearwardly inclined position, a pair of lower clips carried one by each side arm adjacent the lower edge thereof, a flexible member engaging the bottom and the side arms and disposed within said lower clips, a pair of upper clips adapted to engage said flexible member, and means engaging the back and integral with said upper clips to dispose said upper clips in forwardly offset position relative to said back whereby to prevent rearward tilting of the seat.

JOHN F. LUBEY.